(12) United States Patent
Watanabe (10) Patent No.: US 9,316,303 B2
(45) Date of Patent: Apr. 19, 2016

(54) PLANET ROLLER SPEED CHANGER

(71) Applicant: JTEKT CORPORATION, Osaka-shi, Osaka (JP)

(72) Inventor: Hajime Watanabe, Kashiwara (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 14/572,256

(22) Filed: Dec. 16, 2014

(65) Prior Publication Data

US 2015/0184738 A1    Jul. 2, 2015

(30) Foreign Application Priority Data

Dec. 27, 2013   (JP) .................................. 2013-272833

(51) Int. Cl.

| F16H 13/06 | (2006.01) |
|---|---|
| F16H 57/08 | (2006.01) |
| F16H 13/08 | (2006.01) |
| F16H 57/12 | (2006.01) |

(52) U.S. Cl.
CPC .............. *F16H 57/082* (2013.01); *F16H 13/06* (2013.01); *F16H 13/08* (2013.01); *F16H 2057/085* (2013.01); *F16H 2057/127* (2013.01)

(58) Field of Classification Search
None
See application file for complete search history.

(56) References Cited

U.S. PATENT DOCUMENTS

| 4,648,288 | A * | 3/1987 | Kato ....................... F16H 13/10 |
|---|---|---|---|
| | | | 475/183 |
| 8,282,523 | B2 * | 10/2012 | Inayoshi ............... F16C 27/066 |
| | | | 475/183 |

FOREIGN PATENT DOCUMENTS

| JP | S58156758 A | 9/1983 |
|---|---|---|
| JP | S6353358 A | 3/1988 |
| JP | H0674313 A | 3/1994 |
| JP | A-6-174026 | 6/1994 |
| JP | A-10-38045 | 2/1998 |

OTHER PUBLICATIONS

Apr. 22, 2015 extended Search Report issued in European Patent Application No. 14198993.9.

* cited by examiner

*Primary Examiner* — Dirk Wright
(74) *Attorney, Agent, or Firm* — Oliff PLC (57) ABSTRACT

A first radial bearing and a second radial bearing are respectively disposed in two rows between the outer periphery of a pin and the inner periphery of a corresponding planet roller so as to face each other in the thrust direction. A first inner ring of the first radial bearing is fitted onto a first region of the pin by interference fit. A second inner ring of the second radial bearing is fitted onto a second region of the pin by clearance fit. The second region is closer to a carrier main body than the first region is. An elastic member is interposed between the second radial bearing and the carrier main body. The elastic member elastically presses the second inner ring in a first thrust direction.

4 Claims, 5 Drawing Sheets

PLANET ROLLER SPEED CHANGER

INCORPORATION BY REFERENCE

The disclosure of Japanese Patent Application No. 2013-272833 filed on Dec. 27, 2013 including the specification, drawings and abstract, is incorporated herein by reference in its entirety.

BACKGROUND OF THE INVENTION

1. Field of the Invention

The invention relates to a planet roller speed changer.

2. Description of the Related Art

A planet roller speed changer (traction drive) is conventionally known. The planet roller speed changer includes an input shaft, an output shaft, a stationary ring, a plurality of cylindrical planet rollers, and a carrier fixed to the output shaft. The stationary ring is disposed concentrically with the input shaft. The planet rollers are brought into rolling contact with both the input shaft and the stationary ring. The carrier is fixed to the output shaft. There is a planet roller speed changer in which pins that protrude from a carrier are passed through the inner peripheries of planet rollers such that the planet rollers are rotatably supported.

If there is a clearance between the inner periphery of each planet roller and the outer periphery of a corresponding one of the pins, the clearance serves as a backlash and may cause rotational fluctuations during revolution of the planet rollers. In order to prevent such rotational fluctuations, for example, Japanese Patent Application Publication No. 6-174026 (JP 6-174026 A) proposes that a double-row radial bearing including two radial bearings, such as a double-row deep groove ball bearing, be disposed between the inner periphery of each planet roller and the outer periphery of a corresponding one of the pins.

In order to further effectively prevent formation of the above-described backlash in the planet roller speed changer as described in JP 6-174026 A, a preload may be applied to each of the radial bearings respectively disposed in two rows, thereby maintaining the bearing internal clearance of each of the radial bearings at a negative clearance. For example, a positioning preload may be adopted as a preload applied to each of the radial bearings. For example, when the first and second radial bearings are angular contact bearings, it is necessary to control the stand out of each radial bearing in order to maintain a thrust internal clearance at a negative clearance.

However, an appropriate magnitude of preload needs to be applied to the radial bearings described above. If the magnitude of preload applied to each of the radial bearings is too low, a clearance may be formed between the inner periphery of each of the planet rollers and the outer periphery of a corresponding one of the radial bearings. On the other hand, if the magnitude of preload applied to each of the radial bearings is too high, smooth revolution of the planet rollers may be hindered or indentations may be formed in the inner peripheries of the planet rollers. Further, in the planet roller speed changer, each of the planet rollers is disposed so as to be pressed against both the stationary ring and the input shaft for torque transmission, the inner diameter of each planet roller varies in the circumferential direction. With this variation in inner diameter taken into account, it is necessary to apply a preload having a magnitude within such a range that no clearance is left between the planet roller and the radial bearing and no indentations or the like are formed. For this reason, radial bearings interposed between the planet rollers and the pins are required to have an extremely high accuracy of the bearing internal clearance. This may result in a cost increase.

SUMMARY OF THE INVENTION

One object of the invention is to suppress or prevent occurrence of rotational fluctuations due to a clearance between the inner periphery of a planet roller and the outer periphery of a radial bearing without incurring a cost increase, thereby providing an inexpensive planet roller speed changer having high rotation accuracy.

An aspect of the invention relates to a planet roller speed changer including: an input shaft; a stationary ring disposed around the input shaft so as to be concentric with the input shaft; a plurality of cylindrical planet rollers that are in rolling contact with both the input shaft and the stationary ring; an output shaft; a carrier including a carrier main body fixed to the output shaft so as to be rotatable together with the output shaft, and a plurality of pins which extend from the carrier main body in a thrust direction, each of which is disposed in a corresponding one of the planet rollers, and each of which passes through the corresponding one of the planet rollers; and multiple pairs of first and second radial bearings, the first and second radial bearings in each of the multiple pairs being respectively disposed in two rows between an outer periphery of a corresponding one of the pins and an inner periphery of a corresponding one of the planet rollers so as to face each other in the thrust direction, and supporting the planet roller such that the planet roller is rotatable. A first inner ring of each of the first radial bearings, the first radial bearing being farther from the carrier main body than a corresponding one of the second radial bearings, is fitted, by interference fit, onto a first region of the outer periphery of the pin, the first region being far from the carrier main body. A second inner ring of each of the second radial bearings, the second radial bearing being closer to the carrier main body than a corresponding one of the first radial bearings, is fitted, by clearance fit, onto a second region of the outer periphery of the pin, the second region being closer to the carrier main body than the first region. The planet roller speed changer further comprises elastic members each of which is interposed between a corresponding one of the second radial bearings and the carrier main body, and elastically presses a corresponding one of the second inner rings in the thrust direction that is a direction away from the carrier main body.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
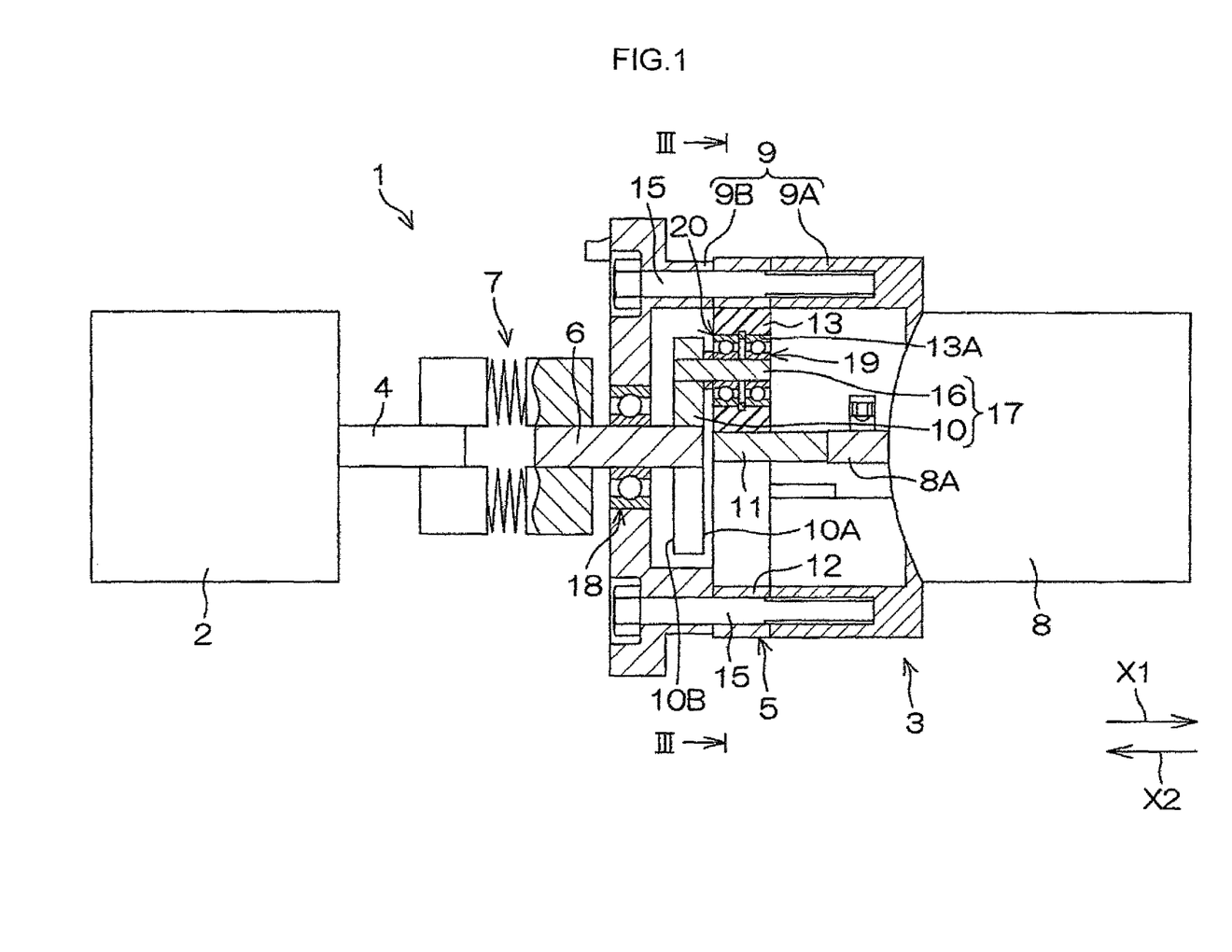
FIG. 1 is a view illustrating the schematic configuration of a power transmitting device of an image forming apparatus in which a planet roller speed changer according to an embodiment of the invention is mounted.
Figure 2:
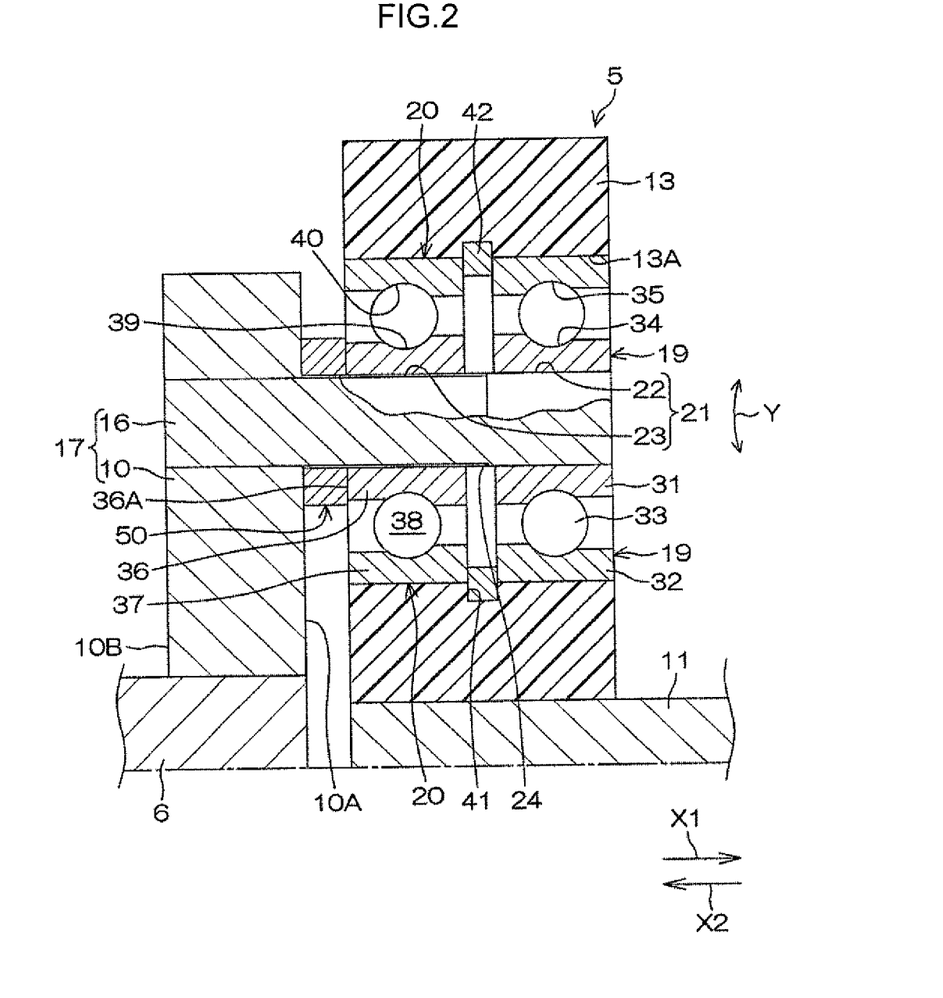
FIG. 2 is an enlarged sectional view illustrating main portions of the planet roller speed changer according to the embodiment of the invention.
Figure 3:
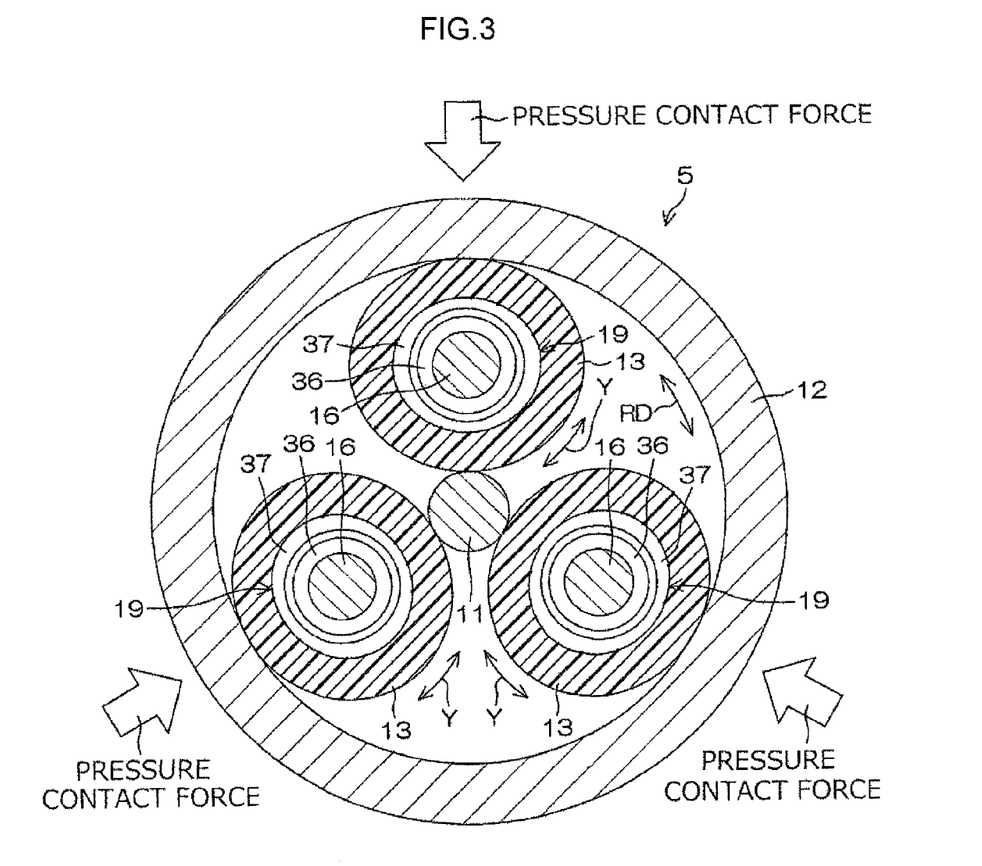
FIG. 3 is a cross-sectional view taken along the line III-III in FIG. 1.

Hereinafter, example embodiments of the invention will be described with reference to the accompanying drawings. FIG. 1 is a view illustrating the schematic configuration of a power transmitting device 1 of an image forming apparatus such as a printer, in which a planet roller speed changer 5 according to an embodiment of the invention is mounted. FIG. 2 is an enlarged sectional view illustrating main portions of the planet roller speed changer 5 according to the embodiment of the invention. FIG. 3 is a cross-sectional view taken along the line III-III in FIG. 1.

The power transmitting device 1 of the image forming apparatus includes a body 2 to be driven (hereinafter, referred to as "driven body 2"), a planet roller speed changing unit 3, and a coupling 7. The driven body 2 is driven to be rotated by the planet roller speed changing unit 3. The coupling 7 couples a driven body input shaft 4 of the driven body 2 and an output shaft 6 of the planet roller speed changer 5 to each other. In the power transmitting device 1, the planet roller speed changing unit 3 is mounted transversely so that the output shaft 6 extends horizontally. The planet roller speed changing unit 3 includes an electric motor 8, the planet roller speed changer 5, and a housing 9. The housing 9 houses the electric motor 8 and the planet roller speed changer 5 together with each other. The housing 9 includes a motor housing 9A made of, for example, aluminum, and a carrier housing 9B made of, for example, aluminum. The motor housing 9A houses and holds the electric motor 8. The carrier housing 9B houses and holds a part of the output shaft 6 and a carrier main body 10, which will be described later.

The planet roller speed changer 5 includes an input shaft 11, a stationary ring (sun ring) 12, a plurality of (for example, three in the present embodiment) planet rollers 13, the output shaft 6, a carrier 17, a first radial bearing 19, a second radial bearing 20, and an elastic member 50. The carrier 17 has a plurality of pins 16 (the number of the pins 16 is equal to the number of the planet rollers 13) passing through the planet rollers 13. The first and second radial bearings 19, 20 are interposed between the pin 16 and the corresponding planet roller 13. The elastic member 50 is interposed between the carrier 17 and a second inner ring 36, and elastically presses the second inner ring 36 (see FIG. 2) in a first thrust direction (thrust direction away from the carrier main body 10) X1. In the following description, a thrust direction toward one side (the right side in FIG. 1 and FIG. 2) will be referred to as the first thrust direction X1, whereas a thrust direction toward the other side (the left side in FIG. 1 and FIG. 2) will be referred to as a second thrust direction X2. The circumferential direction of each of the first and second radial bearings 19, 20, the elastic member 50, and the planet roller 13 will be referred to as a circumferential direction Y (see FIG. 2).

A motor shaft 8A of the electric motor 8 is coupled to the input shaft 11. Alternatively, the motor shaft 8A may be provided as the input shaft 11. The stationary ring 12 is fixed concentrically with the input shaft 11 and held between the motor housing 9A and the carrier housing 9B. The stationary ring 12 has an annular shape and is made of, for example, bearing steel. The motor housing 9A, the stationary ring 12, and the carrier housing 9B are fixed together with a plurality of bolts 15.

The planet rollers 13 are housed and disposed in the stationary ring 12. The planet rollers 13 are arranged at equal angular intervals in an annular space formed between the stationary ring 12 and the input shaft 11. Each of the planet rollers 13 is disposed so as to be in rolling contact with both the outer peripheral face of the input shaft 11 and the inner peripheral face of the stationary ring 12 via lubricant in a pressure contact state. Each of the planet rollers 13 has a cylindrical shape (or an annular shape), and is made of, for example, bearing steel.

The carrier 17 includes the disc-shaped carrier main body 10, and a plurality of the columnar pins 16 that protrude from a one side face (right side face in FIG. 1) 10A of the carrier main body 10 perpendicularly to the one side face 10A. The pins 16 protrude from the one side face (right side face in FIG. 1) 10A of the carrier main body 10 perpendicularly to the one side face 10A. The pins 16 may be components formed separately from the carrier main body 10 as illustrated in FIG. 1 and FIG. 2, or may be formed integrally with the carrier main body 10. Each of the pins 16 has a columnar shape, and is made of, for example, bearing steel. Each pin 16 passes through a corresponding one of the planet rollers 13, and the planet roller 13 is supported rotatably in a loosely fitted state by the pin 16.

The output shaft 6 is fixed to the other side face 10B (left side face in FIG. 1 and FIG. 2) of the carrier main body 10. An intermediate portion of the output shaft 6 is supported at one point by the carrier housing 9B via a single roller bearing 18. Thus, the output shaft 6 is rotatably disposed. The first and second radial bearings 19, 20 are, for example, single-row angular ball bearings, and are respectively disposed in two rows as a back-to-back arrangement duplex bearing (DB), while facing each other in the thrust directions X1, X2. The number of the pairs of first and second radial bearings 19, 20 is equal to the number of the planet rollers 13. Each of the planet rollers 13 is rotatably supported by the corresponding first and second radial bearings 19, 20.

Rotary driving force from the electric motor 8 is applied to the input shaft 11, whereby each planet roller 13 rotates about its axis in a prescribed rotational direction, and in addition, the planet rollers 13 revolve in a prescribed revolving direction. The carrier 17 rotates (about its axis) due to the revolutions of the planet rollers 13. Rotary driving force of the carrier 17 is taken out from the planet roller speed changer 5 via the output shaft 6. With the rotary driving force, the driven body 2 of the image forming apparatus is driven to be rotated.

Next, features of the invention will be described with reference to FIG. 2. Each pin 16 has a two-step columnar shape. A region of an outer peripheral face 21 of the pin 16, which is exposed on the outside of the carrier 17, includes, from the distal end side, a first region 22 (a region far from the carrier main body 10) and a second region 23 (a region closer to the carrier main body 10 than the first region 22 is). The first region 22 is a large-diameter cylindrical face. The second region 23 is a small-diameter cylindrical face that is coaxial with the first region. The first radial bearing 19 is fitted onto the first region 22. The second radial bearing 20 is fitted onto the second region 23. The first and second regions 22, 23 are connected with each other via a step 24 having a small height. More specifically, the first region 22 has a diameter larger than the inner diameter of a first inner ring 31 (described below) of the first radial bearing 19. In contrast, the second region 23 has a diameter smaller than the inner diameter of the second inner ring 36 (described below) of the second radial bearing 20.

The first radial bearing 19 includes the first inner ring 31, a first outer ring 32, a plurality of balls 33, and a first cage (not illustrated). The first balls 33 are rolling elements disposed between the first inner ring 31 and the first outer ring 32. The first cage retains the first balls 33 at substantially regular intervals between the first inner ring 31 and the first outer ring 32. A first inner ring raceway 34 is formed in the outer peripheral face of the first inner ring 31. A first outer ring raceway 35 is formed in the inner peripheral face of the first outer ring 32. The first raceways 34, 35 are circular arc-shaped raceways.

The first radial bearing 19 is interposed between the first region 22 of the pin 16 and a portion of an inner peripheral face 13A of the planet roller 13, which is on the side indicated by the arrow pointing in the first thrust direction X1 (the right side in FIG. 2). Because the first region 22 has a diameter larger than the inner diameter of the first inner ring 31 as described above, the first inner ring 31 is fitted onto the first region 22 by interference fit. The second radial bearing 20 includes the second inner ring 36, a second outer ring 37, a plurality of second balls 38, and a second cage (not illustrated). The second balls 38 are rolling elements disposed between the second inner ring 36 and the second outer ring 37. The second cage retains the second balls 38 at substantially regular intervals between the second inner ring 36 and the second outer ring 37. A second inner ring raceway 39 is formed in the outer peripheral face of the second inner ring 36. A second outer ring raceway 40 is formed in the inner peripheral face of the second outer ring 37. The second raceways 39, 40 are circular arc-shaped raceways.

The second radial bearing 20 is interposed between the second region 23 of the pin 16 and a portion of the inner peripheral face 13A of the planet roller 13, which is on the side indicated by the arrow pointing in the second thrust direction X2 (the left side in FIG. 2). Because the second region 23 has a diameter smaller than the inner diameter of the second inner ring 36 as described above, the second inner ring 36 is fitted onto the second region 23 by clearance fit. In the present embodiment, the first and second radial bearings 19, 20 share the same design.

An annular spacer 42, which is fitted in an annular groove 41 formed in the inner peripheral face 13A of the planet roller 13, is interposed between the first outer ring 32 and the second outer ring 37. As the first outer ring 32 and the second outer ring 37 come into contact with the spacer 42, the first outer ring 32 and the second outer ring 37 are positioned in the thrust directions X1, X2. The elastic member 50 has an annular plate shape and is disposed around the outer peripheral face 21 of the pin 16. The elastic member 50 is made of an elastic material (e.g., spring steel). The elastic member 50 presses the second inner ring 36 over the entire circumference. The elastic member 50 is positioned while being held between the other end face 36A of the second inner ring 36 and the one side face 10A of the carrier main body 10. The distance between the other end face 36A of the second inner ring 36 and the one side face 10A of the carrier main body 10 is smaller than the thickness of the elastic member 50 that has not been fitted onto the pin 16. Thus, the elastic member 50 is interposed in an elastically contracted state between the other end face 36A of the second inner ring 36 and the one side face 10A of the carrier main body 10. When interposed between the other end face 36A and the one side face 10A, the elastic member 50 elastically presses the other end face 36A of the second inner ring 36 in the first thrust direction X1 (thrust direction away from the carrier main body 10). The elastic member 50 presses the other end face 36A of the second inner ring 36 over the entire circumference. As a load headed along the first thrust direction X1 is applied to the second inner ring 36, the thrust internal clearance of the second radial bearing 20 is turned into a negative clearance. As a result, a preload is applied to the second radial bearing 20 (constant pressure preload). The material of the elastic member 50 and the amount of contraction of the elastic member 50 in the fitted state are selected and set such that the magnitude of preload applied to the second radial bearing 20 is within an appropriate range.

As illustrated in FIG. 3, the planet rollers 13 are each disposed so as to be pressed against both the stationary ring 12 and the input shaft 11 for torque transmission. Thus, when mounted in the planet roller speed changer 5, each planet roller 13 has an elliptic shape with its major axis extending in a revolution direction RD. When a pressure contact force acting on the planet roller 13 is large, the eccentricity of the ellipse becomes large, so that the inner periphery of the planet roller 13 becomes larger near the ends of the planet roller 13 in the revolution direction RD. As a result, if the magnitude of preload applied to the second radial bearing 20 is insufficient, a clearance may be left between the inner periphery of the planet roller 13 and the outer periphery of the pin 16 near the ends of the planet roller 13 in the revolution direction RD. Moreover, as the inner diameter of the planet roller 13 varies in the circumferential direction Y, the amount of pressure contact of the outer peripheries of the radial bearings 19, 20 with the inner periphery of the planet roller 13 may vary in the circumferential direction Y.

As described above, however, the first inner ring 31 of the first radial bearing 19 is fixed to the outer periphery of the pin 16 by press-fitting, and the second inner ring 36, which is fitted onto the outer periphery of the pin 16 by clearance fit, is elastically pressed by the elastic member 50 in the first thrust direction X1. Thus, the clearance between the inner periphery of the planet roller 13 and the outer periphery of the first radial bearing 19 is eliminated over the entire region in the circumferential direction Y, and the amount of pressure contact of the outer peripheries of the radial bearings 19, 20 with the inner periphery of the planet roller 13 is maintained within a desired range.

According to the present embodiment, the first inner ring 31 of the first radial bearing 19 is fitted onto the first region 22 of the pin 16 by interference fit. In other words, the first inner ring 31 is fixed to the outer periphery of the pin 16 by press-fitting. That is, the first radial bearing 19 is press-fitted to both the outer periphery of the pin 16 and the inner periphery of the planet roller 13. Thus, it is possible to further reliably prevent formation of a clearance between the inner periphery of the planet roller 13 and the outer peripheries of the radial bearings 19, 20.

The second inner ring 36 of the second radial bearing 20 is fitted onto the second region 23 of the pin 16 by clearance fit. The elastic member 50, which is interposed between the other end face 36A of the second inner ring 36 and the one side face 10A of the carrier main body 10, elastically presses the second inner ring 36 in the first thrust direction X1. As the load headed in the first thrust direction X1 is applied to the second inner ring 36, the thrust internal clearance of the second radial bearing 20 is turned into a negative clearance. The amount of thrust internal clearance (the amount of negative clearance) of the second radial bearing 20 is set to a desired amount by adjusting the elastic pressing force of the elastic member 50 through selection of, for example, the material of the elastic member 50.

While no preload is applied to the first radial bearing 19, a preload is applied the second radial bearing 20 and the magnitude of the preload is adjusted. In this way, the clearance between the inner periphery of the planet roller 13 and the outer peripheries of the radial bearings 19, 20 is eliminated over the entire region in the circumferential direction Y and the amount of pressure contact of the outer peripheries of the radial bearings 19, 20 with the inner periphery of the planet roller 13 is maintained within the desired range. Because it is not necessary to control the stand out of the second radial bearing 20 to adjust the preload to be applied to the second radial bearing 20, no cost increase is incurred.

Thus, without incurring a cost increase, the clearance between the inner periphery of the planet roller 13 and the outer peripheries of the radial bearings 19, 20 is eliminated over the entire region in the circumferential direction Y. At the same time, the amount of pressure contact of the outer peripheries of the radial bearings 19, 20 with the inner periphery of the planet roller 13 is maintained within the desired range. As a result, it is possible to suppress or prevent occurrence of rotational fluctuations due to the clearance between the inner periphery of the planet roller 13 and the outer peripheries of the first and second radial bearings 19, 20. Hence, the inexpensive planet roller speed changer 5 having high rotation accuracy is provided.

Figure 4A:
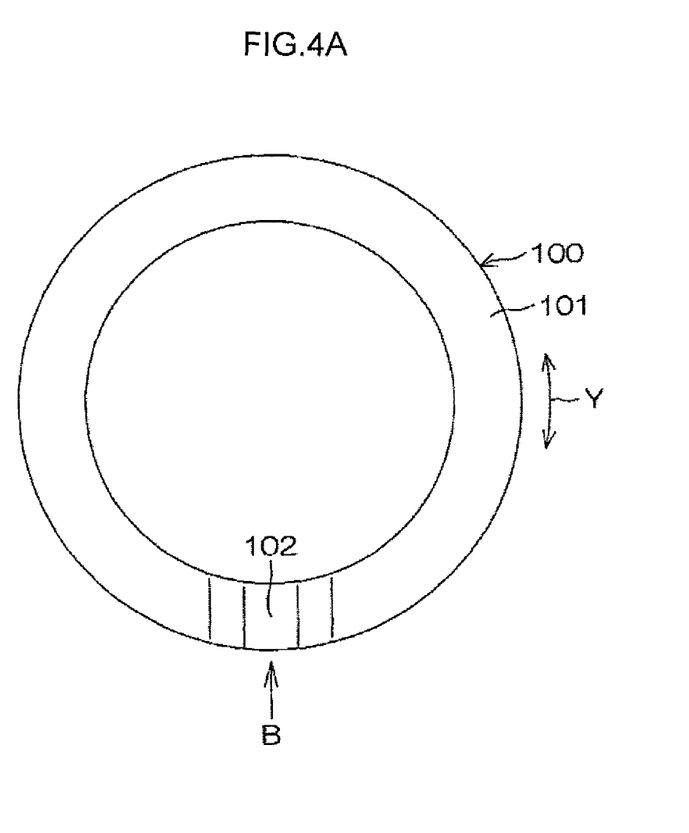
FIG. 4A and FIG. 4B are views each illustrating an elastic member according to another embodiment of the invention.
Figure 4B:
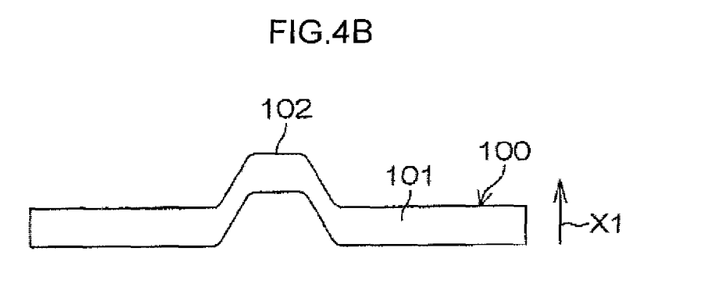
Figure 5:
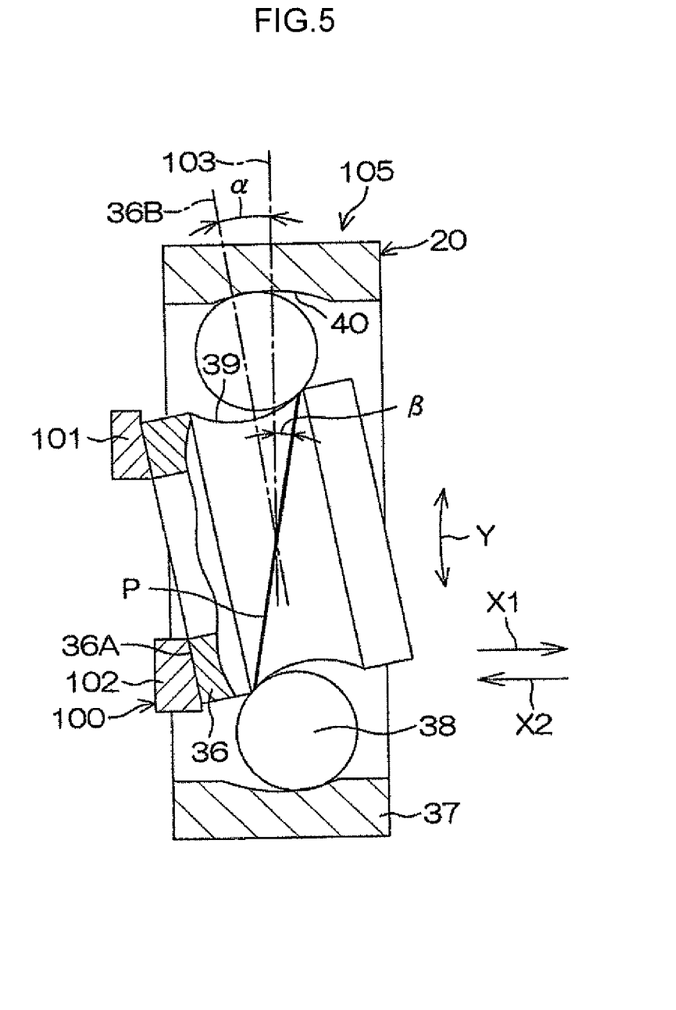
FIG. 5 is an enlarged sectional view illustrating main portions of a planet roller speed changer according to the other embodiment of the invention.

FIG. 4A and FIG. 4B are views each illustrating an elastic member 100 mounted in a planet roller speed changer 105 according to another embodiment of the invention. FIG. 4A is a plan view of the elastic member 100. FIG. 4B is a view of the elastic member 100 as viewed from the indicated by an arrow B in FIG. 4A. FIG. 5 is an enlarged sectional view illustrating main portions of the planet roller speed changer 105 according to the other embodiment of the invention. In FIG. 5, only the configurations of the second radial bearing 20 and the elastic member 100 are illustrated, while the configurations of other components are not illustrated.

The planet roller speed changer 105 differs from the planet roller speed changer 5 according to the above-described embodiment in that the elastic member 100 is used instead of the elastic member 50. As illustrated in FIG. 4, the elastic member 100 has an annular plate-like elastic member main body 101 and a protrusion 102. The elastic member main body 101 surrounds the outer periphery of the corresponding pin 16. The protrusion 102 protrudes in the first thrust direction X1 from a portion in the circumferential direction Y, of the elastic member main body 101. The protrusion 102 is formed integrally with the elastic member main body 101. The elastic member 100 is made of an elastic material (e.g., spring steel).

As illustrated in FIG. 5, in the present embodiment, the elastic member 100 is interposed between the other end face 36A of the second inner ring 36 and the one side face 10A of the carrier main body 10 (see FIG. 2 etc.), with the protrusion 102 positioned on the innermost side in the radial direction of the planet roller speed changer 105, among all the portions of the elastic member 100 in the circumferential direction Y. When the elastic member 100 is fitted to the pin 16, the elastic member 100 presses the second inner ring 36 over the entire circumference. In this state, the protrusion 102 is in contact with a portion of the other end face 36A of the second inner ring 36, which is positioned on the innermost side in the radial direction of the planet roller speed changer 105, among all the portions of the other end face 36A in the circumferential direction Y. Further, the protrusion 102 presses the above-described portion of the other end face 36A. Thus, when the elastic member 100 is fitted to the pin 16, the second inner ring 36 is tilted along the thrust directions X1, X2. Specifically, a plane 36B perpendicular to the central axis of the second inner ring 36 is tilted by α° in the second thrust direction X2, relative to a plane 103 that is perpendicular to the input shaft 11 (see FIG. 2 etc.) as the plane 36B extends outward in the rotational radial direction.

The second inner ring 36 is tilted along the thrust directions X1, X2, relative to the plane 103 perpendicular to the input shaft 11. Thus, the set of contact points P (in FIG. 5, the set of contact points P is indicated by the bold continuous line) at which the balls 38 contact the raceway 39 of the second inner ring 36, which is formed of a circular arc-shaped raceway, is tilted by β° along the first thrust direction X1, when viewed from the circumferential direction Y of the outer ring 37, relative to the plane 103 that is perpendicular to the input shaft 11 (see FIG. 2 etc.) as the set of the contact points P extends outward in the rotational radial direction. Thus, when viewed from the thrust directions X1, X2, the set of the contact points P has an elliptic shape with its major axis extending in the revolution direction RD. In the present embodiment, the amount of protrusion of the protrusion 102 is set such that the eccentricity of the set of the contact points P defining an elliptic shape when viewed from the thrust directions X1, X2 is substantially equal to the eccentricity of the planet roller 13 (see FIG. 3 etc.) having an elliptic shape.

Thus, according to the present embodiment, the protrusion 102 that protrudes in the first thrust direction X1 from the elastic member main body 101 presses the second inner ring 36. As a result, the second inner ring 36 is tilted along the thrust directions X1, X2, relative to the plane 103 that is perpendicular to the input shaft 11. In this state, when viewed from the thrust directions X1, X2, the set of the contact points P, at which the balls 38 contact the raceway 39 of the second inner ring 36, defines an elliptic shape with its major axis extending in the revolution direction RD, as in the case of the planet rollers 13 that are pressed against the stationary ring 12 and the input shaft 11. Therefore, the shape of the set of the contact points P when viewed from the thrust directions X1, X2 coincides with the shape of the planet roller 13 that are pressed against the stationary ring 12 and the input shaft 11. Thus, it is possible to further reliably prevent formation of a clearance between the inner periphery of the planet roller 13 and the outer periphery of the pin 16. It is also possible to further reliably prevent occurrence of rotational fluctuations, because the magnitude of a preload applied to the second radial bearing 20 is made more uniform in the circumferential direction Y.

While the embodiments of the invention have been described above, the invention may be implemented in various other embodiments. As in an embodiment illustrated in FIG. 4A, FIG. 4B and FIG. 5, the elastic member 100 may be disposed such that the protrusion 102 is positioned on the outermost side in the radial direction of the planet roller speed changer 5, among all the portions of the elastic member 100 in the circumferential direction Y. In this case, the protrusion 102 is in contact with a portion of the other end face 36A of the second inner ring 36, which is positioned on the outermost side in the radial direction of the planet roller speed changer 5, among all the portions of the other end face 36A in the circumferential direction Y. Thus, the second inner ring 36 is tilted along the thrust directions X1, X2, relative to the plane 103 that is perpendicular to the input shaft 11 such that a plane perpendicular to the central axis of the second inner ring 36 is tilted toward the first thrust direction X1 by a prescribed angle, relative to the plane 103 perpendicular to the input shaft 11, as the second inner ring 36 extends inward in the rotational radial direction.

In the above-described embodiments, the two-step columnar pin 16 is described as an example of the pin 16. However, the pin 16 may have a flat stepless cylindrical face. In this case, a radial bearing including a first inner ring 31 having an inner diameter smaller than the outer diameter of the pin 16 before being fitted to the pin 16 is selected as the first radial bearing 19, and a radial bearing including a second inner ring 36 having an inner diameter larger than the outer diameter of the pin 16 before being fitted to the pin 16 is selected as the second radial bearing 20. Thus, when the first and second radial bearings 19, 20 are fitted to the pin 16, the first inner ring 31 is fitted onto the outer periphery of the pin 16 by interference fit and the second inner ring 36 is fitted onto the outer periphery of the pin 16 by clearance fit.

The angular ball bearings are described as examples of the first and second radial bearings 19, 20. However, deep groove ball bearings may be adopted as the radial bearings 19, 20. The radial bearings 19, 20 should not be limited to ball bearings, but may be roller bearings. In the embodiments described above, each of the planet roller speed changers 5, 105 is mounted in the image forming apparatus. However, the invention may be applied to planet roller speed changers applied to other kinds of apparatuses.

The elastic members 50, 100 should not be limited to the ones described above. For example, a coned disc spring may be adopted as each of the elastic members 50, 100. Instead of the elastic member 100, a spring washer may be adopted as the elastic member according to the second embodiment. In this case, preferably, a cut of the spring washer is positioned on the innermost side or the outermost side in the radial direction of the planet roller speed changer, among all the portions of the spring washer in its circumferential direction.

Further, a variety of design changes may be made within the scope of the invention defined in the appended claims.

According to the invention, it is possible to suppress or prevent occurrence of rotational fluctuations due to the clearance between the inner periphery of the planet roller and the outer periphery of the radial bearing without incurring a cost increase. Hence, the inexpensive planet roller speed changer having high rotation accuracy is provided.

What is claimed is:

1. A planet roller speed changer comprising:
   an input shaft;
   a stationary ring disposed around the input shaft so as to be concentric with the input shaft;
   a plurality of cylindrical planet rollers that are in rolling contact with both the input shaft and the stationary ring;
   an output shaft;
   a carrier including a carrier main body fixed to the output shaft so as to be rotatable together with the output shaft, and a plurality of pins which extend from the carrier main body in a thrust direction, each of which is disposed in a corresponding one of the planet rollers, and each of which passes through the corresponding one of the planet rollers; and
   multiple pairs of first and second radial bearings, the first and second radial bearings in each of the multiple pairs being respectively disposed in two rows between an outer periphery of a corresponding one of the pins and an inner periphery of a corresponding one of the planet rollers so as to face each other in the thrust direction, and supporting the planet roller such that the planet roller is rotatable, wherein
   a first inner ring of each of the first radial bearings, the first radial bearing being farther from the carrier main body than a corresponding one of the second radial bearings, is fitted, by interference fit, onto a first region of the outer periphery of the pin, the first region being far from the carrier main body,
   a second inner ring of each of the second radial bearings, the second radial bearing being closer to the carrier main body than a corresponding one of the first radial bearings, is fitted, by clearance fit, onto a second region of the outer periphery of the pin, the second region being closer to the carrier main body than the first region, and
   the planet roller speed changer further comprises elastic members each of which is interposed between a corresponding one of the second radial bearings and the carrier main body, and elastically presses a corresponding one of the second inner rings in the thrust direction that is a direction away from the carrier main body.

2. The planet roller speed changer according to claim 1, wherein:
   each of the elastic members has an annular plate-like elastic member main body that surrounds the outer periphery of a corresponding one of the pins, and a protrusion that protrudes from one portion in a circumferential direction, of the elastic member main body in the direction away from the carrier main body to press a prescribed portion in the circumferential direction, of a corresponding one of the second inner rings; and
   the protrusion presses the second inner ring, and the second inner ring is tilted along the thrust direction relative to a plane perpendicular to the input shaft.

3. The planet roller speed changer according to claim 1, wherein:
   the first region includes a large-diameter cylindrical face; and
   the second region includes a small-diameter cylindrical face that is coaxial with the large-diameter cylindrical face and that is smaller in diameter than the large-diameter cylindrical face.

4. The planet roller speed changer according to claim 2, wherein:
   the first region includes a large-diameter cylindrical face; and
   the second region includes a small-diameter cylindrical face that is coaxial with the large-diameter cylindrical face and that is smaller in diameter than the large-diameter cylindrical face.

* * * * *